US012017775B2

(12) United States Patent
Cloud et al.

(10) Patent No.: US 12,017,775 B2
(45) Date of Patent: Jun. 25, 2024

(54) SYSTEMS AND METHODS OF DETERMINING A CAPACITY OF STORAGE BINS

(71) Applicant: The Boeing Company, Chicago, IL (US)

(72) Inventors: Mark L Cloud, Seattle, WA (US); Christopher Alvarez, Burien, WA (US)

(73) Assignee: The Boeing Company, Arlington, VA (US)

( * ) Notice: Subject to any disclaimer, the term of this patent is extended or adjusted under 35 U.S.C. 154(b) by 347 days.

(21) Appl. No.: 17/577,998

(22) Filed: Jan. 18, 2022

(65) Prior Publication Data
US 2022/0227491 A1 Jul. 21, 2022

Related U.S. Application Data

(60) Provisional application No. 63/138,965, filed on Jan. 19, 2021.

(51) Int. Cl.
B64D 11/00 (2006.01)
B64D 45/00 (2006.01)
G01F 17/00 (2006.01)

(52) U.S. Cl.
CPC ............ B64D 11/003 (2013.01); B64D 45/00 (2013.01); G01F 17/00 (2013.01); B64D 2045/007 (2013.01)

(58) Field of Classification Search
None
See application file for complete search history.

(56) References Cited

U.S. PATENT DOCUMENTS

| 8,325,232 | B2 | 12/2012 | Lee |
| 9,869,574 | B2 * | 1/2018 | Nicks ................... B64D 11/003 |
| 10,996,051 | B1 * | 5/2021 | Patel ...................... G06Q 50/40 |
| 2015/0241209 | A1 | 8/2015 | Jouper et al. |

(Continued)

FOREIGN PATENT DOCUMENTS

EP   0619865 B1   1/1999

OTHER PUBLICATIONS

European Search Report issued in Application No. 22150417.8 dated Jun. 3, 2022; pp. 8.

Primary Examiner — Peter J Macchiarolo
Assistant Examiner — Jermaine L Jenkins
(74) Attorney, Agent, or Firm — Alleman Hall & Tuttle LLP

(57) ABSTRACT

A system for use in determining a capacity of a storage bin. The system includes a plurality of sensors positioned within the storage bin. Each sensor is configured to determine a used capacity within a portion of the storage bin, and generate a voltage output based on the determined used capacity, wherein the plurality of sensors is configured to generate an aggregate voltage output based on the voltage output of each sensor. A controller is in communication with the plurality of sensors. The controller is configured to receive the aggregate voltage output from the plurality of sensors, determine a minimum voltage output and a maximum voltage output of the plurality of sensors, and determine a total used capacity of the storage bin as a function of the aggregate voltage output, the minimum voltage output, and the maximum voltage output.

20 Claims, 6 Drawing Sheets

(56) References Cited

U.S. PATENT DOCUMENTS

| | | |
|---|---|---|
| 2015/0358002 A1 | 12/2015 | Startin et al. |
| 2017/0328759 A1 | 11/2017 | Nicks |
| 2018/0173962 A1 | 6/2018 | Ibrahim et al. |
| 2018/0335413 A1* | 11/2018 | Jouper .................... G01F 17/00 |
| 2018/0359985 A1 | 12/2018 | Jung et al. |
| 2019/0202564 A1 | 7/2019 | Jung et al. |
| 2019/0212183 A1 | 7/2019 | Zajac et al. |
| 2019/0233113 A1 | 8/2019 | Carswell |

* cited by examiner

SYSTEMS AND METHODS OF DETERMINING A CAPACITY OF STORAGE BINS

CROSS-REFERENCE TO RELATED APPLICATIONS

This application claims priority to U.S. Application Ser. No. 63/138,965, filed Jan. 19, 2021, and entitled SYSTEMS AND METHODS OF DETERMINING A CAPACITY OF STORAGE BINS, which is hereby incorporated by reference in its entirety.

FIELD

The field relates generally to overhead storage bin assemblies and, more specifically, to systems and methods of determining and displaying a used capacity within overhead storage bins.

BACKGROUND

Modern day flights are typically booked to full capacity, which makes overhead storage space a desired but limited commodity. As such, it may be difficult for later-boarding passengers to find sufficient or conveniently located overhead storage space for their carryon luggage. For example, the overhead storage space may be at full capacity before all the carryon luggage has been stowed, which causes frustration for the passengers and delay in the boarding process. In some instances, available overhead space may be located several rows away from a passenger's seat, which may cause delays in embarking and disembarking from the aircraft. Additional delay may also be a result of the time it takes to individually inspect storage bins to identify remaining overhead storage space.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is a system for use in determining a capacity of a storage bin. The system includes a plurality of sensors positioned within the storage bin. Each sensor is configured to determine a used capacity within a portion of the storage bin, and generate a voltage output based on the determined used capacity, wherein the plurality of sensors is configured to generate an aggregate voltage output based on the voltage output of each sensor. A controller is in communication with the plurality of sensors. The controller is configured to receive the aggregate voltage output from the plurality of sensors, determine a minimum voltage output and a maximum voltage output of the plurality of sensors, and determine a total used capacity of the storage bin as a function of the aggregate voltage output, the minimum voltage output, and the maximum voltage output.

Another aspect is a vehicle including a passenger cabin, a plurality of storage bins coupled within the passenger cabin, and a plurality of sensors positioned within each storage bin. Each sensor is configured to determine a used capacity within a portion of the storage bin, and generate a voltage output based on the determined used capacity, wherein the plurality of sensors is configured to generate an aggregate voltage output based on the voltage output of each sensor. A controller is in communication with the plurality of sensors. The controller is configured to receive the aggregate voltage output from the plurality of sensors, determine a minimum voltage output and a maximum voltage output of the plurality of sensors, and determine a total used capacity of the storage bin as a function of the aggregate voltage output, the minimum voltage output, and the maximum voltage output.

Yet another aspect is a method of determining a capacity of a storage bin. The method includes determining, with one of a plurality of sensors within the storage bin, a used capacity within a portion of the storage bin. Each sensor is configured to generate a voltage output based on the determined used capacity, and the plurality of sensors is configured to generate an aggregate voltage output based on the voltage output of each sensor. The method also includes receiving the aggregate voltage output from the plurality of sensors, determining a minimum voltage output and a maximum voltage output of the plurality of sensors, and determining a total used capacity of the storage bin as a function of the aggregate voltage output, the minimum voltage output, and the maximum voltage output.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Examples described below include systems and methods of determining and displaying a used capacity within overhead storage bins. More specifically, the system described herein includes a plurality of sensors within each storage bin for determining a used capacity within each storage bin. The system uses an algorithm that correlates voltage readings received from the sensors into available space. The voltage readings may be aggregated to determine a total used capacity within each storage bin, and an indication of the total used capacity may be provided to either the passengers or flight crew of an aircraft via a display. As such, the passengers or flight crew are able to quickly determine the location of available overhead storage space when boarding the aircraft.

As used herein, an element or step recited in the singular and preceded with the word "a" or "an" should be understood as not excluding plural elements or steps, unless such exclusion is explicitly recited. Furthermore, references to "example", "example implementation" or "one implementation" of the present disclosure are not intended to be interpreted as excluding the existence of additional implementations that also incorporate the recited features.

Figure 1:
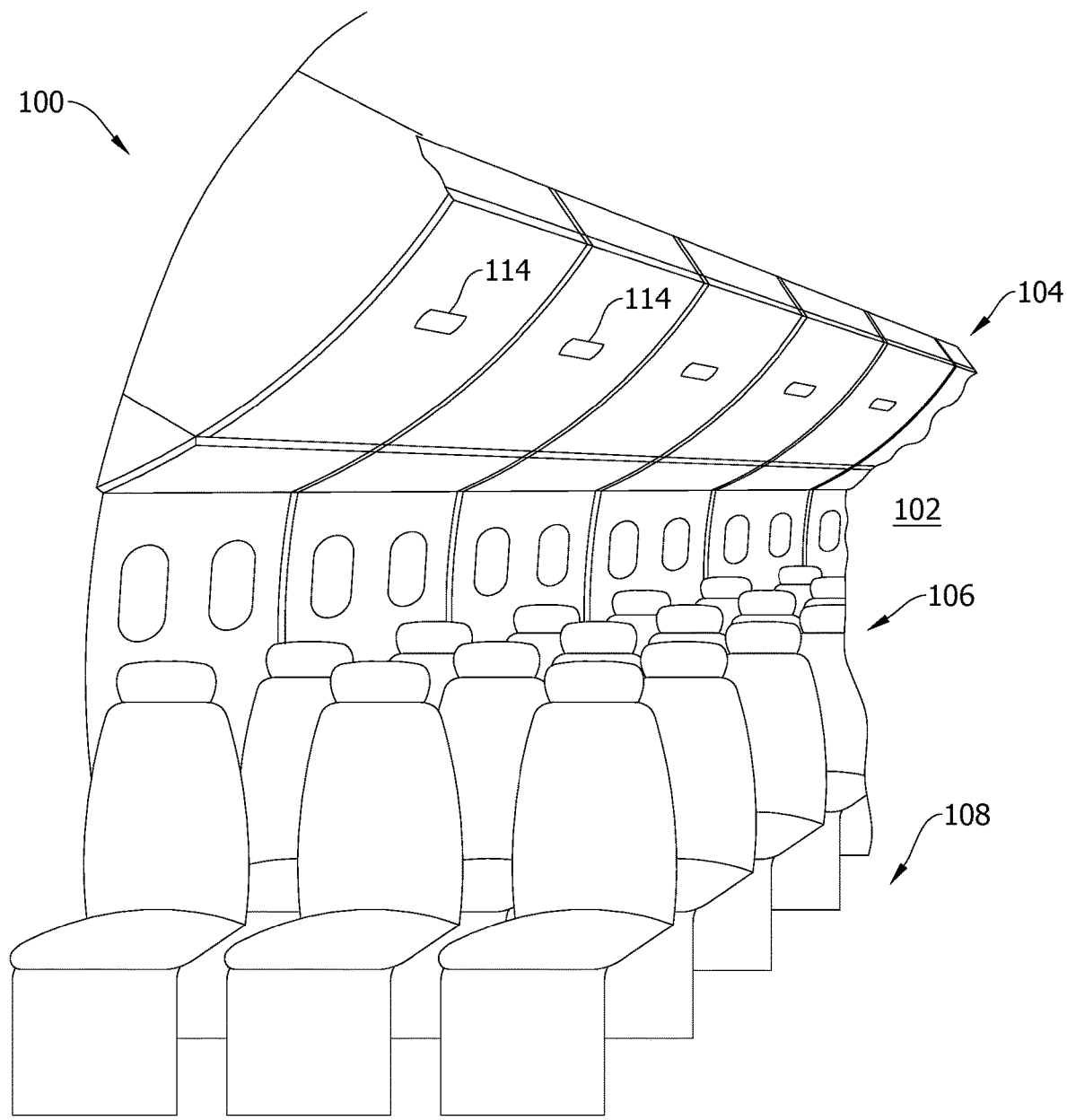
FIG. 1 is an internal view of an example aircraft.

FIG. 1 is an internal view of an example aircraft 100 (i.e., a vehicle). In the example implementation, aircraft 100 includes a passenger cabin 102 and a plurality of overhead storage bins 104 coupled within passenger cabin 102. Passenger cabin 102 also includes a seating area 106 and an aisle 108 extending along passenger cabin 102 for providing access to the plurality of overhead storage bins 104 and seating area 106. The plurality of overhead storage bins 104 are selectively positioned between an open position and a closed position for receiving and stowing one or more objects (e.g., luggage) therein. While described in the context of a passenger aircraft, application of the systems and methods described herein is not limited to passenger aircraft. For example, the systems and methods described herein may be implemented with any cargo-carrying vehicle such as, but not limited to, buses and trains.

Figure 2:
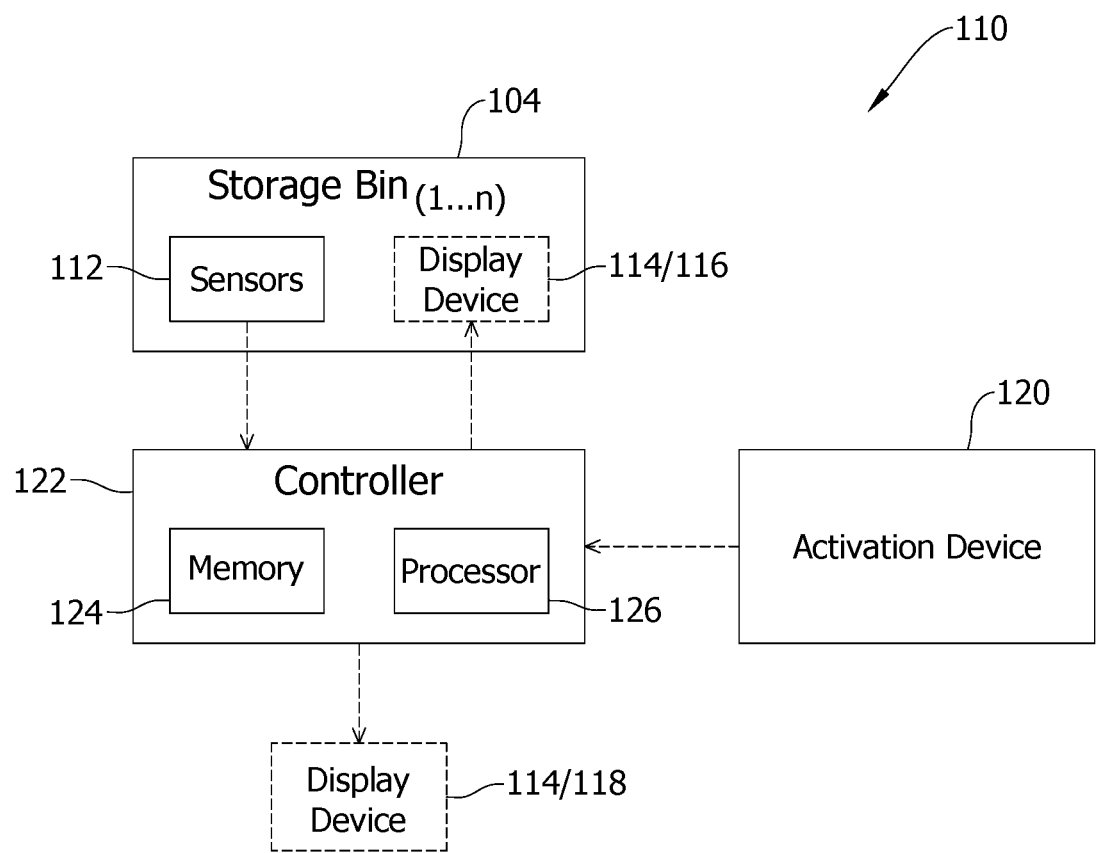
FIG. 2 is a block diagram illustrating an example system for determining a capacity within a storage bin.

FIG. 2 is a block diagram illustrating an example system 110 for determining a capacity within storage bins 104. System 110 includes a plurality of sensors 112 (e.g. 112-1 through 112-12) positioned within each storage bin 104. Sensors 112 may be any device capable of determining a used capacity within at least a portion of storage bin 104. Accordingly, the plurality of sensors 112 may be arranged to enable a total used capacity of storage bin 104 to be determined. In the example embodiment, sensors 112 are time-of-flight camera sensors configured to emit a light signal, and determine the distance of an obstruction from the respective sensor 112 based on a time it takes for a return signal, derived from the emitted light signal, to be received at sensor 112. Alternative sensors 112 include, but are not limited to, pressure and/or resistive force sensors.

In operation, sensors 112 generate a voltage output based on an analysis of the return signal. As will be explained in more detail below, the voltage output generated by a respective sensor 112 is variable based on a distance between the respective sensor 112 and the obstruction (e.g., an opposing side wall of storage bin 104 or a piece of luggage), and the voltage outputs of the plurality of sensors 112 within a respective storage bin 104 may be used to determine a total used capacity therein.

System 110 further includes a display device 114 configured to display the total used capacity, such as to the passengers or flight crew of aircraft 100. In one embodiment, at least one display device 116 is associated with each storage bin 104, and the respective display device 114 displays the total used capacity of its associated storage bin 104. In the example embodiment, display devices 116 are light-emitting diode (LED) indicators including a plurality of LEDs (not shown) that may be selectively activated for displaying one of a plurality of capacity indicators for the associated storage bin 104. For example, the capacity indicators may be defined by different colors that each correspond to a determined capacity level, or defined by a number of LEDs activated based on the determined capacity level.

Alternatively, or in addition to coupling a display device 116 to each storage bin 104, a display device 118 may be a distinct device that is positioned remotely from the plurality of storage bins 104. More specifically, display device 118 may receive and display the total used capacity of each storage bin 104 within aircraft 100. For example, display device 118 may be at an entryway of passenger cabin 102 such that passengers can view potentially available overhead storage space as they are boarding aircraft 100, may be a flight attendant panel, or may be a passenger's mobile device having an application downloaded thereon.

System 110 further includes an activation device 120 configured to control the operational status of system 110 (i.e., sensors 112 and display devices 114). Activation device 120 enables system 110 to be activated only when appropriate, such as during boarding of aircraft 100. Accordingly, in one embodiment, activation device 120 monitors an operational status of one or more components of aircraft 100 that may be linked to an appropriate activation time. For example, activation device 120 may be a sensor that monitors the opening and closing of a respective storage bin 104, a weight-on-wheels sensor, a sensor that monitors the opening and closing of a cabin door, or may monitor a power generation state of aircraft 100 (i.e., system 110 activated when ground or APU power is provided). Alternatively, system 110 may be activated and deactivated manually. Accordingly, selectively activating system 110 facilitates preserving energy.

A controller 122 is in communication with sensors 112, display devices 114, and activation device 120. Controller 122 includes a memory 124 and a processor 126, including hardware and software, coupled to memory 124 for executing programmed instructions. Processor 126 may include one or more processing units (e.g., in a multi-core configuration) and/or include a cryptographic accelerator (not shown). Controller 122 is programmable to perform one or more operations described herein by programming memory 124 and/or processor 126. For example, processor 126 may be programmed by encoding an operation as executable instructions and providing the executable instructions in memory 124.

Processor 126 may include, but is not limited to, a general purpose central processing unit (CPU), a microcontroller, a microprocessor, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 126, cause processor 126 to perform at least a portion of the functions described herein. The above examples are for example purposes only, and thus are not intended to limit in any way the definition and/or meaning of the term processor.

Memory 124 is one or more devices that enable information such as executable instructions and/or other data to be stored and retrieved. Memory 124 may include one or more computer-readable media, such as, without limitation, dynamic random access memory (DRAM), synchronous dynamic random access memory (SDRAM), static random access memory (SRAM), a solid state disk, and/or a hard disk. Memory 124 may be configured to store, without limitation, executable instructions, operating systems, applications, resources, installation scripts and/or any other type of data suitable for use with the methods and systems described herein.

Instructions for operating systems and applications are located in a functional form on non-transitory memory 124 for execution by processor 126 to perform one or more of the processes described herein. These instructions in the different implementations may be embodied on different physical or tangible computer-readable media, such as memory 124 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 122 to permit access and/or execution by processor 126. In an alternative implementation, the computer-readable media is not removable.

Figure 3:
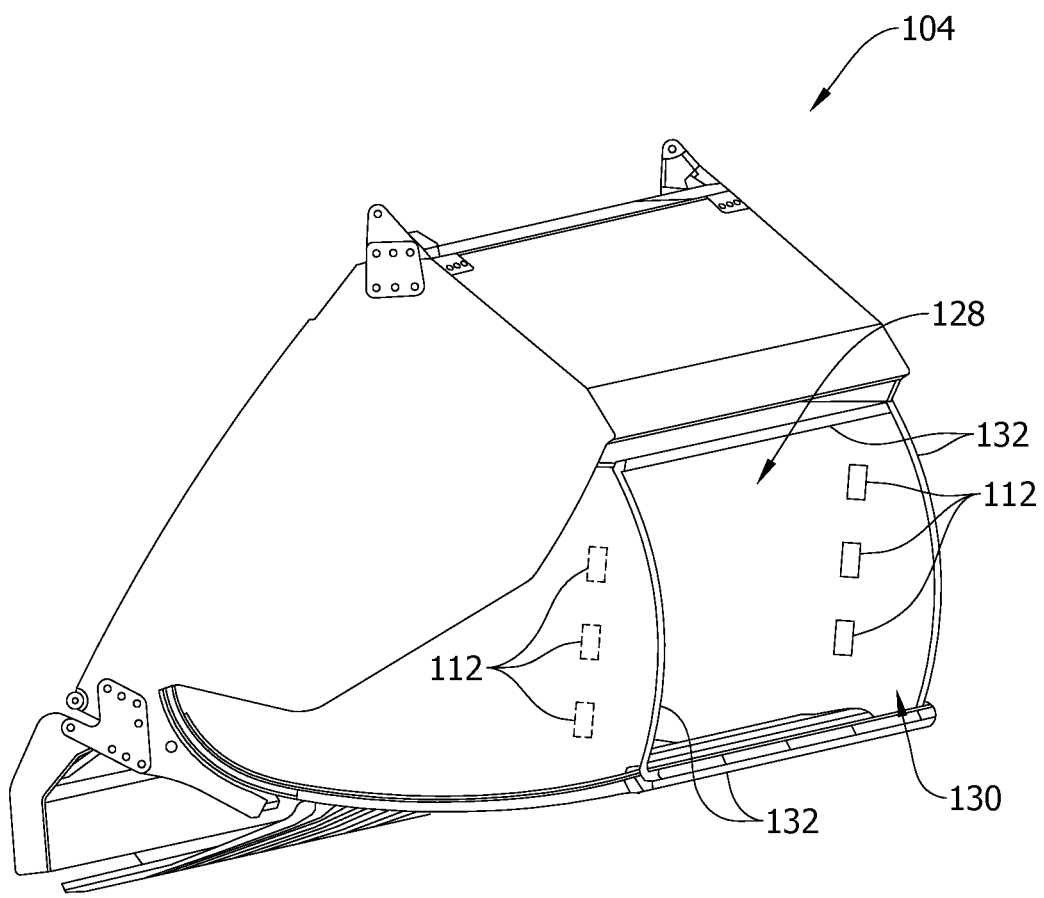
FIG. 3 is a perspective view of a storage bin that may be used in the aircraft shown in FIG. 1.
Figure 4:
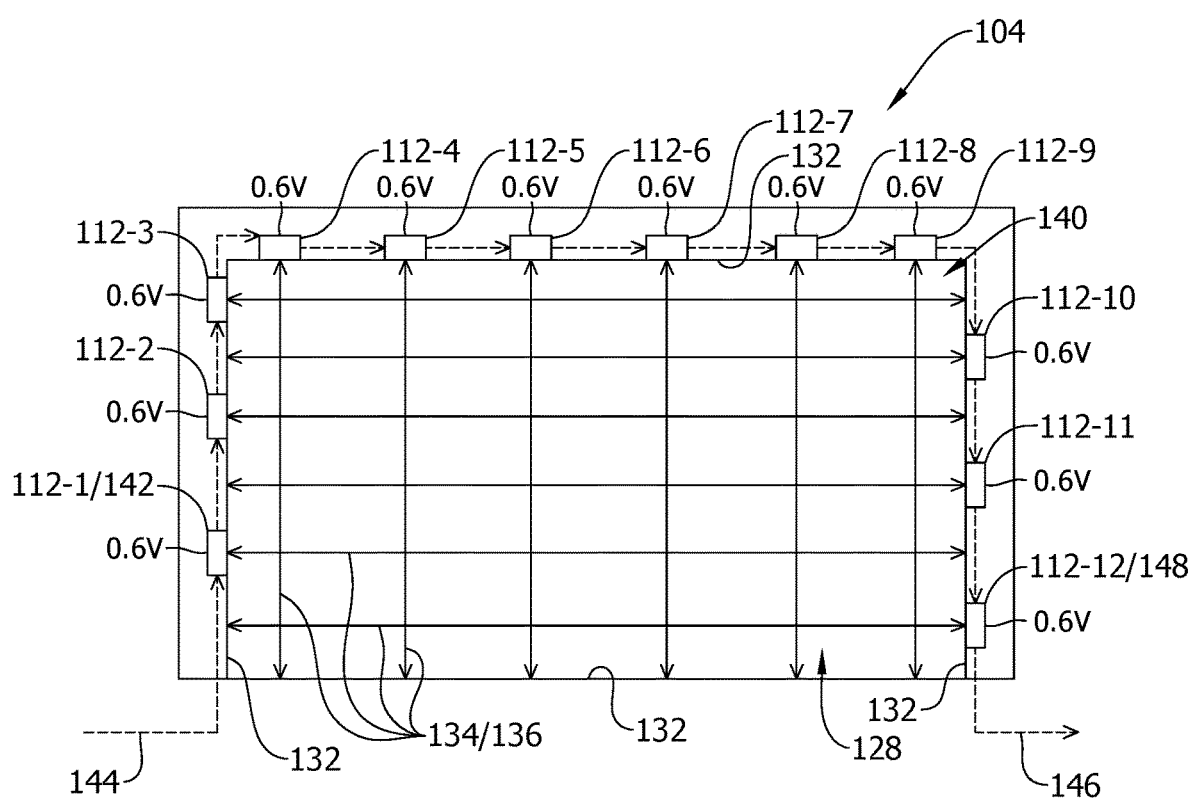
FIG. 4 is a schematic interior view of the storage bin shown in FIG. 3.
Figure 5:
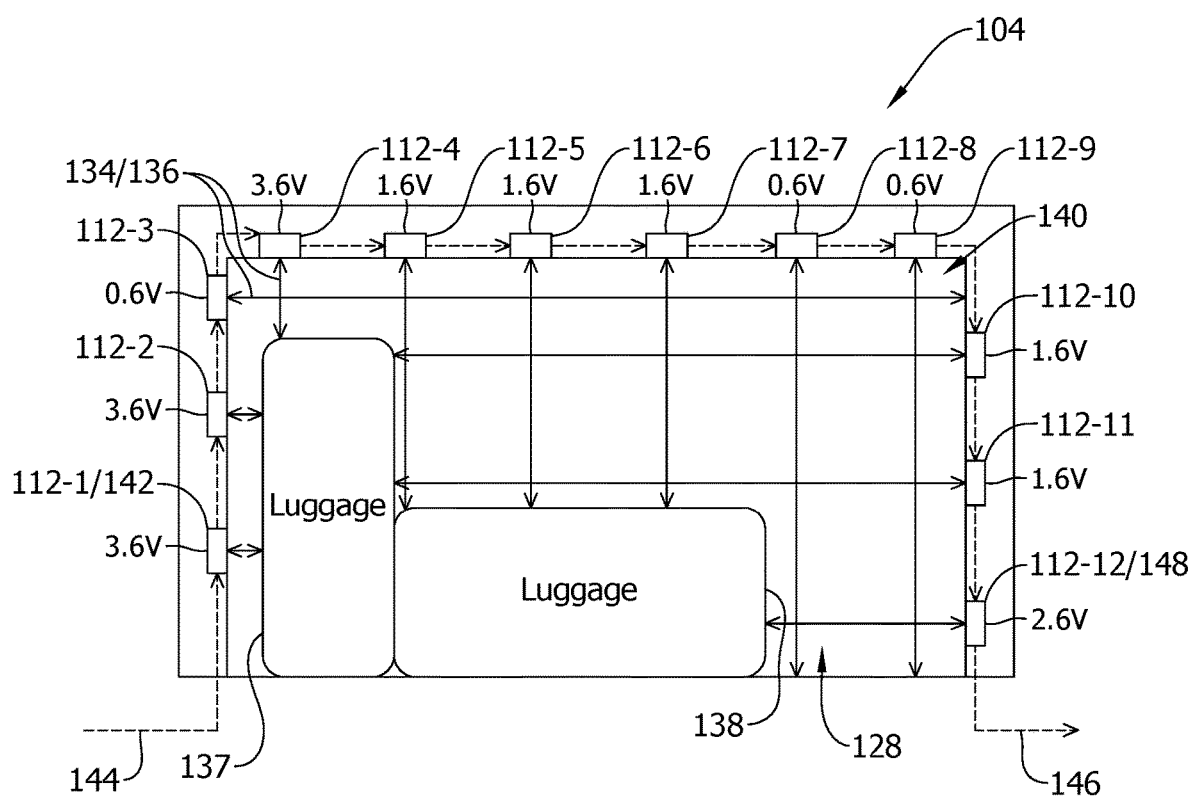
FIG. 5 is a schematic interior view of the storage bin shown in FIG. 3, the bin having luggage stored therein.

FIGS. 3-5 illustrate sensors 112 positioned within storage bin 104. Referring to FIG. 3, storage bin 104 includes an interior 128 and an opening 130 that provides access to interior 128. Interior 128 is defined by a plurality of side walls 132, and sensors 112 are coupled to one or more of side walls 132 and arranged in an array across side walls 132. In the example embodiment, each sensor 112 emits a signal 134 therefrom, and receives a return signal 136 derived from the bounce back of signal 134 from an obstruction such as an opposing side wall 132 or luggage 138 (shown in FIG. 5) positioned within interior 128. Accordingly, as shown in FIGS. 4 and 5, signals 134 from sensors 112 define a two-dimensional sensing grid 140 across interior 128 of storage bin 104. In an alternative embodiment, sensors 112 are coupled only to one side wall 132, such as a top side wall 132 of storage bin 104 to define the two-dimensional sensing grid 140 from the vertically-aligned signals 134 emitted therefrom.

As shown in FIGS. 4 and 5, a first sensor 142 of the plurality of sensors 112 is provided with ground power 144 (e.g., 5 VDC), and the plurality of sensors 112 (1-12) are electrically coupled to each other in series. Accordingly, a bias signal may be cascaded across the plurality of sensors 112 to enable an aggregate voltage output 146 to be generated and output by the array of sensors 112. In one embodiment, aggregate voltage output 146 is a single output signal transmitted in analog from a last sensor 148 of those coupled in series in the array. As such, the complexity and computing power required to analyze aggregate voltage output 146 is reduced. As used herein, analog refers to a continuous, not discrete, voltage value. In an alternative embodiment, each sensor 112 provides its own digital output signal for analysis, such as to an I²C multiplexer and Arduino board. As used herein, digital refers to a discrete, not continuous, voltage value.

When powered, each sensor 112 generates a voltage output that is variable within a range defined by a minimum voltage output and a maximum voltage output. Variation in the voltage output is dependent on the sensed distance between a respective sensor 112 and an object. For example, sensors 112 may be calibrated to generate the minimum voltage output when storage bin 104 is empty and the space within the field of view of each sensor 112 is unobstructed (e.g., when the sensed distance is determined to be at a threshold level). Alternatively, the voltage output generated by each sensor 112 increases when luggage 137, 138 is positioned within storage bin 104 to obstruct the field of view of at least one sensor 112 (i.e., the voltage output increases up to the maximum voltage output as the sensed distance decreases). For example, the maximum voltage output is generated when luggage 137, 138 is sized to reduce the sensed distance to less than a threshold level.

In operation, controller 122 receives aggregate voltage output 146 from the plurality of sensors 112. Controller 122 also determines a total minimum voltage output and a total maximum voltage output of the plurality of sensors 112, and determines a total used capacity of the storage bin as a function of aggregate voltage output 146, the total minimum voltage output, and the total maximum voltage output. The total maximum and minimum voltage outputs are determined as a function of the number of sensors 112 within system 110.

In one embodiment, system 110 includes twelve sensors 112 each having a minimum voltage output of about 0.6 Volts (V) and a maximum voltage output of about 3.6 V, such that the total minimum voltage output of the plurality of sensors 112 is about 7.2 V and the total maximum voltage output is about 43.2 V. Referring to FIG. 5, luggage 137, 138 are positioned within interior 128 of storage bin 104. Luggage 137 is sized to obstruct the field of view of some, but not all, of the plurality of sensors 112 in the array. Similarly, luggage 138 is sized to obstruct the field of view of some, but not all, of the plurality of sensors 112 in the array. As illustrated in the example shown in FIG. 5, each sensor 112 generates its own respective voltage output based on the sensed distance between a respective sensor 112 and an object (e.g., side wall 132, or luggage 137, 138), as described above. The fullness or the used capacity of storage bin 104 may be determined in accordance with the following equation:

$$\text{Voltage Output}_{Aggregate} - \frac{(\text{Voltage Output}_{Min} * \# \text{ Sensors})}{(\text{Voltage Output}_{Max} * \# \text{ Sensors})} * 100$$

which enables the used capacity of storage bin 104 illustrated in FIG. 5 to be calculated as follows:

$$\frac{(3*3.6 \text{ V} + 1*2.6 \text{ V} + 5*1.6 \text{ V} + 3*0.6 \text{ V}) - (0.6 \text{ V} *12)}{(3.6 \text{ V} *12)} * 100 =$$

$$37.04\%$$

As described above, display devices 114 (shown in FIG. 2) display one of a plurality of capacity indicators for the associated storage bin 104, wherein the distinct capacity indicators correspond to a determined capacity level within storage bin 104. In the example embodiment, a plurality of capacity threshold ranges may be defined by and/or stored within controller 122. In operation, controller 122 determines the total used capacity of storage bin 104, compares the determined total used capacity to the capacity threshold ranges, and controls operation of an associated display device 114 based on the comparison. An example capacity threshold scheme may include capacity threshold ranges such as a <50% used capacity range, a 50-90% used capacity range, and a >90% used capacity range. A distinct capacity indicator may correspond to each threshold range (e.g., a green indicator light for the <50% used capacity range, a yellow indicator light for the 50-90% used capacity range, and a red indicator light for the >90% used capacity range). Accordingly, displaying the distinct capacity indicator enables passengers and the flight crew to quickly and easily determine the location of available overhead storage space.

Figure 6:
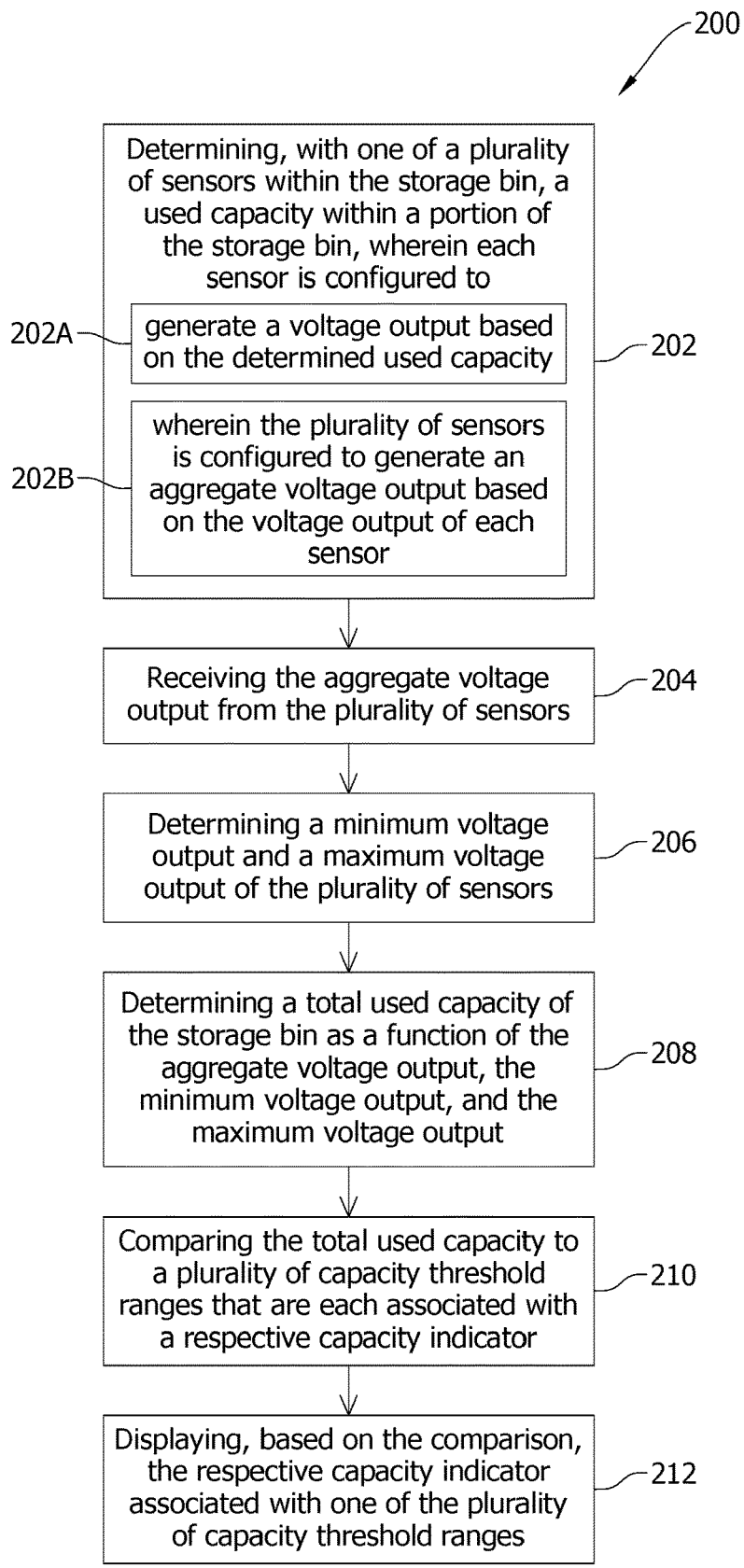
FIG. 6 is a flow diagram illustrating an example method of determining a capacity within a storage bin.

FIG. 6 is a flow diagram illustrating an example method 200 of determining a capacity within a storage bin. The method 200 includes determining 202, with one of a plurality of sensors within the storage bin, a used capacity within a portion of the storage bin. Each sensor is configured to generate (202A) a voltage output based on the determined used capacity, and the plurality of sensors is configured to generate 202B an aggregate voltage output based on the voltage output of each sensor. The method 200 also includes receiving 204 the aggregate voltage output from the plurality of sensors, determining 206 a minimum voltage output and a maximum voltage output of the plurality of sensors, and determining 208 a total used capacity of the storage bin as a function of the aggregate voltage output, the minimum voltage output, and the maximum voltage output. The method 200 also includes comparing 210 the total used capacity to a plurality of capacity threshold ranges that are each associated with a respective capacity indicator, and displaying 212, based on the comparison, the respective capacity indicator associated with one of the plurality of capacity threshold ranges.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. A system for use in determining a capacity of a storage bin, the system comprising:
   a plurality of sensors positioned within the storage bin, wherein each sensor is configured to:
      determine a used capacity within a portion of the storage bin; and
      generate a voltage output based on the determined used capacity, wherein the plurality of sensors is configured to generate an aggregate voltage output based on the voltage output of each sensor; and
   a controller in communication with the plurality of sensors, the controller configured to:
      receive the aggregate voltage output from the plurality of sensors;
      determine a minimum voltage output and a maximum voltage output of the plurality of sensors; and
      determine a total used capacity of the storage bin as a function of the aggregate voltage output, the minimum voltage output, and the maximum voltage output.

2. The system in accordance with claim 1, wherein the plurality of sensors are electrically coupled to each other in series to generate the aggregate voltage output in a single output signal.

3. The system in accordance with claim 2, wherein the plurality of sensors is configured to transmit the single output signal in analog.

4. The system in accordance with claim 1, wherein the plurality of sensors are arranged to define a two-dimensional sensing grid across an interior of the storage bin.

5. The system in accordance with claim 1 further comprising a display device in communication with the controller, wherein the display device is configured to display the total used capacity of the storage bin.

6. The system in accordance with claim 5, wherein the controller is further configured to compare the total used capacity to a plurality of capacity threshold ranges that are each associated with a respective capacity indicator, wherein the display device is configured to display, based on the comparison, the respective capacity indicator associated with one of the plurality of capacity threshold ranges.

7. The system in accordance with claim 1, wherein each sensor is a time-of-flight camera sensor.

8. A vehicle comprising:
   a passenger cabin;
   a plurality of storage bins coupled within the passenger cabin;
   a plurality of sensors positioned within each storage bin, wherein each sensor is configured to:
      determine a used capacity within a portion of the storage bin; and
      generate a voltage output based on the determined used capacity, wherein the plurality of sensors is configured to generate an aggregate voltage output based on the voltage output of each sensor; and
   a controller in communication with the plurality of sensors, the controller configured to:
      receive the aggregate voltage output from the plurality of sensors;
      determine a minimum voltage output and a maximum voltage output of the plurality of sensors; and
      determine a total used capacity of the storage bin as a function of the aggregate voltage output, the minimum voltage output, and the maximum voltage output.

9. The vehicle in accordance with claim 8, wherein the plurality of sensors are electrically coupled to each other in series to generate the aggregate voltage output in a single output signal.

10. The vehicle in accordance with claim 9, wherein the plurality of sensors is configured to transmit the single output signal in analog.

11. The vehicle in accordance with claim 8, wherein each bin comprises an interior and an opening that provides access to the interior, wherein the plurality of sensors are arranged to define a two-dimensional sensing grid across the interior of a respective storage bin.

12. The vehicle in accordance with claim 8 further comprising a display device associated with each storage bin, wherein the display device is configured to display the total used capacity of the associated storage bin.

13. The vehicle in accordance with claim 12, wherein the controller is configured to monitor a boarding status of the vehicle, and is configured to selectively activate at least one of the plurality of sensors or the display device based on the boarding status of the vehicle.

14. The vehicle in accordance with claim 8, wherein each sensor is a time-of-flight camera sensor.

15. A method of determining a capacity of a storage bin, the method comprising:
   determining, with one of a plurality of sensors within the storage bin, a used capacity within a portion of the storage bin, wherein each sensor is configured to generate a voltage output based on the determined used capacity, and wherein the plurality of sensors is configured to generate an aggregate voltage output based on the voltage output of each sensor;

receiving the aggregate voltage output from the plurality of sensors;

determining a minimum voltage output and a maximum voltage output of the plurality of sensors; and determining a total used capacity of the storage bin as a function of the aggregate voltage output, the minimum voltage output, and the maximum voltage output.

16. The method in accordance with claim 15, wherein determining a total used capacity comprises quantifying the total used capacity as a function of a difference between the aggregate voltage output and the minimum voltage output, and as a function of the difference divided by the maximum voltage output.

17. The method in accordance with claim 15, wherein receiving the aggregate voltage output comprises receiving a single output signal in analog.

18. The method in accordance with claim 15 further comprising displaying, on a display device, the total used capacity of the associated storage bin.

19. The method in accordance with claim 18 further comprising:

monitoring a boarding status of a vehicle; and selectively activating at least one of the plurality of sensors or the display device based on the boarding status of the vehicle.

20. The method in accordance with claim 18 further comprising:

comparing the total used capacity to a plurality of capacity threshold ranges that are each associated with a respective capacity indicator; and displaying, on the display device based on the comparison, the respective capacity indicator associated with one of the plurality of capacity threshold ranges.

\* \* \* \* \*